M. BUCK.
VEHICLE SUPPORTING JACK.
APPLICATION FILED JAN. 15, 1918.

1,267,741.

Patented May 28, 1918.

INVENTOR:
Monroe Buck
by Davis & Timms
his attorneys

UNITED STATES PATENT OFFICE.

MONROE BUCK, OF GLENS FALLS, NEW YORK.

VEHICLE-SUPPORTING JACK.

1,267,741. Specification of Letters Patent. Patented May 28, 1918.

Application filed January 15, 1918. Serial No. 211,986.

*To all whom it may concern:*

Be it known that I, MONROE BUCK, a citizen of the United States, and resident of Glens Falls, in the county of Warren and State of New York, have invented certain new and useful Improvements in Vehicle-Supporting Jacks, of which the following is a specification.

The present invention relates to vehicle supporting jacks and more particularly to the type which is employed for supporting vehicles so that the weight of the latter is not on the tires, this result being especially advantageous for vehicles employing pneumatic tires. An object of this invention is to provide a strong and durable jack which may be compactly folded when not in use so as to be stored in a small space.

To this and other ends, the invention consists of certain parts and combinations of parts, all of which will be hereinafter described, the novel features being pointed out in the appended claim.

In the drawings:—

In the embodiment of the invention herein illustrated, 1 and 2 indicate the brace members preferably formed of wood and having their opposed sides near their upper ends beveled at 3 and lying in abutment when the jack is in operative position. The extreme upper ends of these brace members are each notched at 4, the two notches forming a pocket to receive an axle, a hub of a wheel of a vehicle, or any other suitable part of the vehicle.

Figure 3:
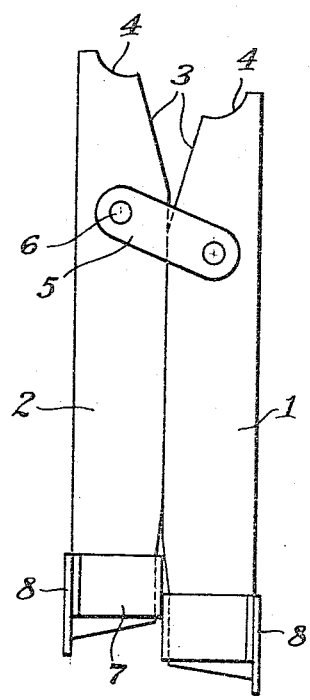
Fig. 3 shows the jack folded.
Figure 4:
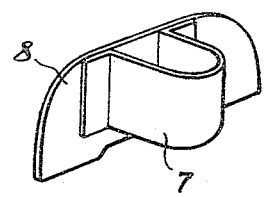
Fig. 4 is a perspective view of one of the feet of the jack.

The two brace members are pivotally connected together preferably by a pair of links 5, the members of which are arranged on opposite sides of the two brace members and are pivoted to both of said brace members, as at 6, at points below the upper parts of the abutting portions. This arrangement permits the rigid securing of the brace members in supporting positions while at the same time said brace members may be folded compactly or in parallel relation, as shown in Fig. 3.

At the lower end of each brace is a foot member comprising an open-ended tapered socket portion 7 with laterally extending portions 8 preferably on the outer side of the socket portion. These feet members prevent the jack from falling to either side and at the same time do not interfere with folding of the jack.

Figure 1:
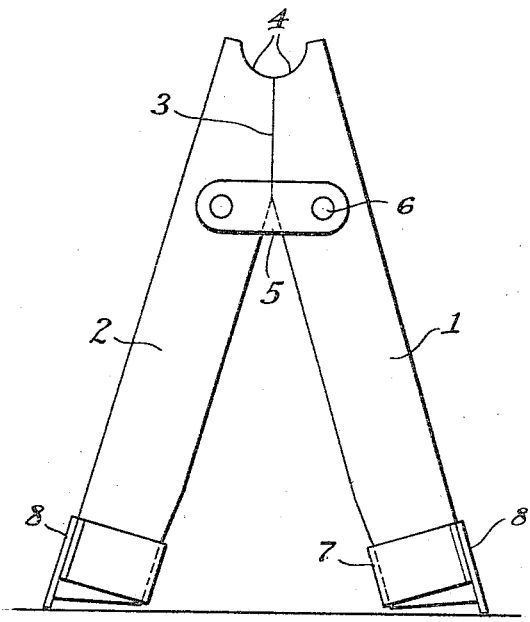
Figure 1 is a side view of a jack embodying the present invention.
Figure 2:
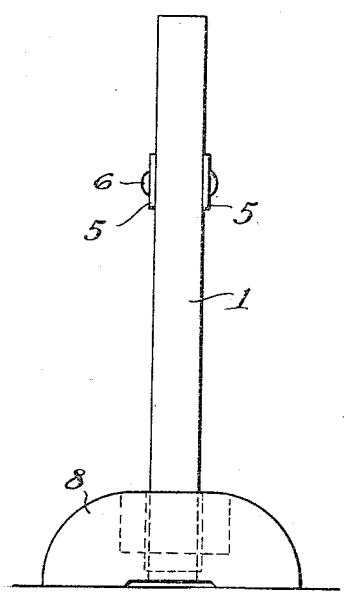
Fig. 2 is a view at right angles to the view illustrated in Fig. 1.

To support an automobile or other vehicle, the latter is elevated by an ordinary lifting jack and the supporting jacks are placed under the vehicle in an open position, as shown in Fig. 1, so as to receive the axles or hubs. These jacks form an inexpensive means for holding the vehicle off the tires.

What I claim as my invention and desire to secure by Letters Patent is:—

A vehicle supporting jack comprising two brace members having their opposed sides near their upper ends beveled and abutting, the extreme upper ends of said brace members being provided with notches forming a single pocket between them, a pair of links pivoted to opposite sides of the two brace members below said pocket to permit the brace members to fold in parallel relation, and two foot pieces, one for each brace, each foot piece lying on the outer side of its brace and projecting in opposite directions from the plane of the two braces, each foot piece also having a socket portion on its inner face substantially midway between the projecting ends of the foot piece receiving the lower end of the brace.

MONROE BUCK.

Copies of this patent may be obtained for five cents each, by addressing the "Commissioner of Patents, Washington, D. C."